April 6, 1926.

M. L. MARTUS ET AL 1,579,558

PRIMARY BATTERY

Original Filed June 2, 1924

INVENTOR.
Martin L. Martus,
Edmund H. Becker, and
James G. Ross
BY
Chamberlain + Newman ATTORNEYS.

April 6, 1926.

M. L. MARTUS ET AL

PRIMARY BATTERY

Original Filed June 2, 1924    2 Sheets-Sheet 2

1,579,558

INVENTOR.
Martin L. Martus,
Edmund H. Becker, and
BY James G. Ross

Chamberlain + Newman
ATTORNEYS.

Patented Apr. 6, 1926.

1,579,558

UNITED STATES PATENT OFFICE.

MARTIN L. MARTUS, OF WOODBURY, AND EDMUND H. BECKER AND JAMES G. ROSS, OF WATERBURY, CONNECTICUT.

PRIMARY BATTERY.

Original application filed June 2, 1924, Serial No. 717,225. Divided and this application filed November 19, 1924. Serial No. 750,886.

*To all whom it may concern:*

Be it known that MARTIN L. MARTUS, of Woodbury, Litchfield County, Connecticut, and EDMUND H. BECKER and JAMES G. ROSS, both of Waterbury, New Haven County, Connecticut, all citizens of the United States, have invented certain new and useful Improvements in Primary Batteries of which the following is a specification.

This invention relates to an improved primary battery, and is a division of our application for primary batteries, filed June 2, 1924, Serial Number 717,225, an object being to provide a battery unit of this character of compact form, particularly adapted for radio or filament lighting, and in which the electrode elements will be supported in a manner as to be entirely spaced from each other and independently mounted, preventing internal short circuits, and further to provide such elements, which may be adjusted vertically independently of each other, and which will be self-centering within the jar or container.

A particular object is to provide a battery of this character adapted to be prepared for functioning merely by the addition of water, and in which the heat generated through formation of the electrolyte is radiated in a manner as not to injuriously effect the battery.

A further object is to provide means for liberating a protective film of oil, in such manner that any possibility of the elements becoming deleteriously coated with the oil is prevented.

With the above and other objects in view, an embodiment of the invention is shown in the accompanying drawings, and this embodiment will be hereinafter more fully described with reference thereto, and the invention will be finally pointed out in the claims, In the drawings:

Similar reference characters indicate corresponding parts throughout the several figures of the drawings.

Figure 1:
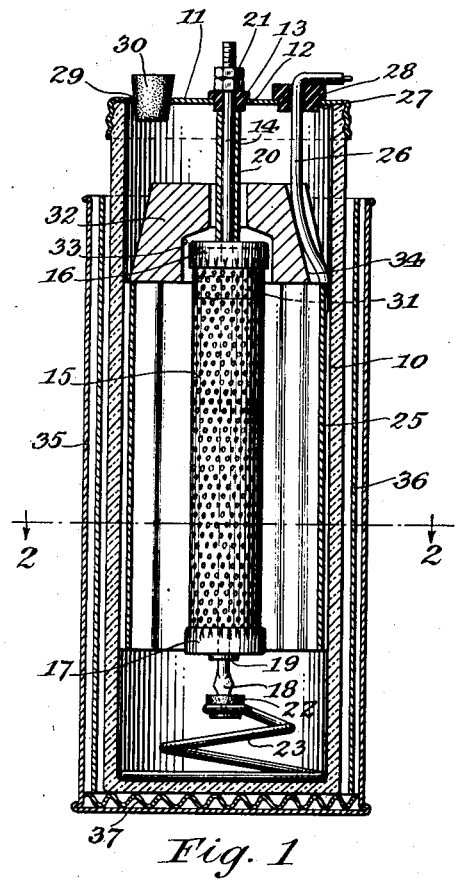
Fig. 1 is a vertical sectional view of a battery unit according to the present embodiment of the invention, and showing the same before the addition of water to form the electrolyte.
Figure 2:
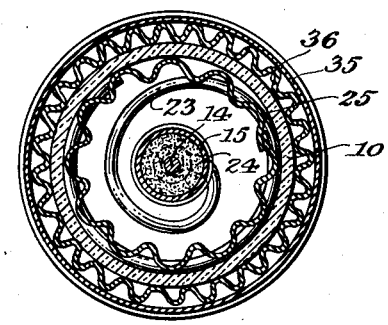
Fig. 2 is a horizontal sectional view thereof, taken along the line 2—2 of Fig. 1.

Referring to the drawings, the battery unit, acording to the present embodiment of the invention, comprises a cylindrical glass jar 10 having a screw-cap 11 thereon, provided with a central aperture 12 having a rubber bushing 13 therein, and in which is engaged a vertical rod 14, upon which the perforated cylindrical basket 15 is supported by flanged caps 16 and 17 engaged upon said rod. This structure makes for a much easier assembly. The rod 14 extends centrally through the basket and said flanged caps and is provided at its lower end with a spear point 18, being flanged adjacent its lower end, as at 19, to engage and support the under side of the basket element. Between the upper cap 16 and the bushing 13, said rod is provided with a spacing tube 20, and its upper end is threaded and provided with securing nuts 21.

The spear point 18 engages an insulating socket member 22 held in the end of a coil spring 23 disposed in the base of the jar 10, and having its lower convolution of circular form and engaging the cylindrical wall of the jar to centralize the element under all conditions of use, and particularly when the battery is subjected to vibration or shock.

The basket 15 contains a suitable negative electrode substance 24, as copper oxide scale, and forms the negative element of the battery.

The positive element 25 of sheet zinc, is of tubular form and vertically corrugated, and is supported within the jar by an insulation covered wire 26 extending upwardly through a perforation 27 in the cap, this perforation being insulated by a rubber bushing 28. The zinc is suspended in its vertically adjusted position by bending the wire over upon the upper end of the bushing 28, as clearly indicated in Fig. 1, and the vertical position may be readily changed, without disturbing the negative electrode by merely raising or lowering the wire and bending the same at a different place. The inner surface of the zinc is annularly spaced from the negative element, and inasmuch as the high points of the corrugations substantially engage the inner surface of the jar the same is vertically positioned and centralized.

The cap is also provided with an aperture 29, having a removable closure stopper 30, of rubber or the like, inserted therein which normally seals the jar substantially air-tight, and can be conveniently removed, for the purpose of initially placing water in the jar, as will be hereinafter more fully pointed out.

According to our invention the two electrode elements of the battery are supported entirely independently of each other, with no connection between them to form bridges or short circuits, such as have occurred heretofore with the usual insulation employed between the elements or the supporting means for the elements. The two elements are self-centralized with respect to the jar and vertical adjustment of the zinc may be effected by merely raising or lowering the wire 26 and bending the same to fix the adjusted position. The elements may be independently removed without disturbing their respective supporting means, so that renewal of either element may be conveniently made.

Within the upper end of the negative element container basket 15 there is provided an oil container 31, preferably in the form of a capsule of a substance adapted to be dissolved or otherwise affected by the battery solution to release the oil, which being lighter than the solution rises to the top to form a protective film. The protective film of oil is adapted to prevent evaporation and capillary creepage of the solution and the manner of liberating the same after the elements are completely submerged by the solution prevents any possibility of the same becoming coated with the oil, as might occur, for instance, when the elements are lowered into a solution having a film of oil already poured thereon.

In order to enable the battery to be prepared for functioning merely by the addition of water, the same is provided with a cake 32 of caustic soda in solid form, having a shouldered passage 33 therethrough for engagement over the upper end of the negative element in spaced relation thereto, and adapted to rest upon the upper end of the zinc element in spaced relation to the wall of the jar. A groove 34 is formed in the side of the cake in which is engaged the lead wire 26 of the zinc element, and which is bent into said groove for the purpose of retaining the cake in position during shipment.

The glass jar 10 is placed in a protective container in the form of a metal can 35, spaced from the jar and having a lining 36 of corrugated paper or other suitable cushioning protective material engaging the jar, and also a bottom protective layer 37 of similar material upon which the jar rests. The container not only protects the jar against shocks, but will retain the electrolyte solution if the jar is accidentally broken. The top of the can serves to indicate the solution line allowing ample splash space in the jar, as a visual indication that the cell contains a liquid and must be handled accordingly. In other words the solution line should be in line with the top end of the outside can.

In order to start the battery to functioning, it is only necessary to add water thereto up to the proper level through the opening 29, the cake 32 dissolving therein to form the electrolyte solution, and the oil contained in the space 31 being liberated to form a protective film or layer.

It will be noted that the jar is relatively tall and of small diameter, and it is important that this ratio is followed, as the efficiency of the battery is dependent thereon to a great extent, the dissolving of the soda, the radiation of the heat of the solution, and the diffusion of the electrolyte all being governed by the height of the jar. A cake of soda of about three ounces dissolves in about twenty minutes, which is slow enough to dissipate the heat very gradually, so that the glass will not crack, and the location of the soda in the jar is such that the solution does not require stirring to dissolve it.

The soda cake is placed and supported at such height above the bottom of the jar to allow sufficient circulation and diffusion, so that the soda will thoroughly dissolve, without agitation or stirring. The dissolving soda being of greater specific gravity than the water tends to drop to the bottom, the lighter water moving upwardly into contact with the soda cake, so that an automatic gravitational circulation is set up through the chemical reaction. The slow dissolving of the soda also dissipates heat so gradually that a special heat resisting glass jar is not required, the time for dissolving the soda being governed by its surface exposure to the solution, the amount of solution displaced by the soda gives the proper solution height to the electrolyte, so that it is impossible to get too much water in the jar.

It will be understood that the invention is adaptable to use with other types of primary battery and secondary battery units, in which case the solution and materials of the elements will be changed as is well known.

Figure 3:
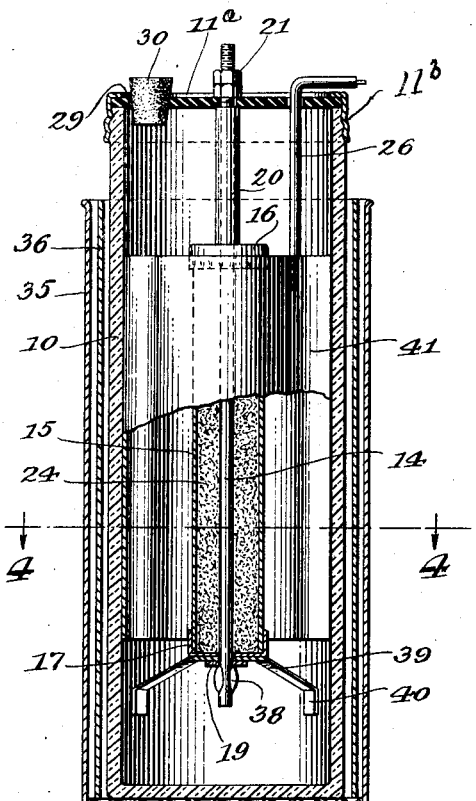
Fig. 3 is a vertical sectional view of a modified battery unit, according to the invention.
Figure 4:
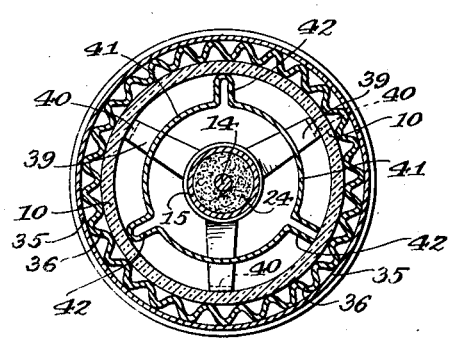
Fig. 4 is a horizontal sectional view thereof, taken along the line 4—4 of Fig. 3.

In the modified form of the invention illustrated in Figs. 3 and 4, the vertical center rod 14 is extended through the perforated cylindrical negative element basket 15 supported thereon by the centrally apertured flanged caps 16 and 17, and being held against longitudinal movement on the rod by the spacing tube 20 at the top and by the washer 19 at the bottom supported upon the rod by pinching out the lower end thereof as at 38.

Between the washer 19 and the cap 17 there is interposed a centrally apertured spring metal spider 39, the radial spring arms of which are inclined outwardly and downwardly, and are bent downwardly at their outer extremities, as at 40 to engage the inner surface of the jar 10, thereby forming a cushion support and centralizing the negative element under all conditions of use, and particularly when the battery is subjected to vibration or shock.
Positive element 41, of sheet zinc, is of cylindrical form and of smaller diameter than the inner surface of the jar, and is provided at a plurality of spaced points with vertically disposed outwardly bent radial ribs 42, which engage the inner surface of the jar 10 and thereby centralize and vertically support and position the element. The zinc is supported within the jar by the insulation covered wire 26 which like the rod 14 extends up through a hole in the insulator plate 11ª, so that the same is spaced at all points from the negative element and its supporting means. The insulator plate in this form is held in position by the screw threaded ring clamp 11ᵇ that is removably attached to the jar.

It is understood that this battery unit may also be provided with the oil container 31, as in the first embodiment and with the cake 32 of electrolyte forming substance.

We have illustrated and described a preferred and satisfactory embodiment of the invention, but it will be obvious that changes may be made therein, within the spirit and scope thereof, as defined in the appended claims.

Having thus described our invention, what we claim and desire to secure by Letters Patent is:
1. In combination, a battery including a jar, a cover, therefor, electrode elements supported in said jar, a cake of soluble electrolyte material in solid form supported in said jar above both of said elements, and adapted to be dissolved by the addition of a liquid to produce the electrolyte solution.

2. In combination, a battery jar, a cover therefor, electrode elements in said jar, a central support for one of said elements depending from said cover, soluble electrolyte material in solid form supported above said elements in said jar, said electrolyte material adapted to be dissolved by the addition of a liquid to produce the electrolyte solution.

3. A primary battery consisting of a jar capable of being hermetically sealed, a cover for said jar, a positive element, a negative element, and an electrolyte in concentrated solid form located above said elements capable of being dissolved by the addition of water.

4. A primary battery consisting of a jar capable of being hermetically sealed, a cover for said jar, a positive element, a negative element, both insulatively supported in said jar, an alkaline salt in concentrated form supported above both of said elements, capable of being dissolved by the addition of water.

5. In a primary battery to which water must be added, a jar, a cover, positive and negative elements, an electrolyte salt in the form of a cake, said cake being held or suspended within the jar above both of said elements.

6. In a primary battery to which water must be added, a jar, a cover, a positive element, a negative element, a space between said elements an electrolyte salt in solid form above both of said elements, the piece or pieces of said salt being thicker than the spacing between said elements.

7. In combination, a battery including a jar, a removable cover therefor, electrode elements secured to and depending from said cover within the jar, an electrolyte salt in the form of a cake supported by said cover above said elements, said elements and said cake being removable from said jar upon the removal of said cover.

8. In combination, a battery including a transparent jar, a cover therefor, electrode elements in said jar, dry electrolyte material in said jar terminating in spaced relation to the upper end thereof and at a point constituting a predetermined electrolyte level to indicate the amount of electrolyte.

Signed at Waterbury, New Haven County, Connecticut, this 12th day of November, A. D. 1924.

MARTIN L. MARTUS.
EDMUND H. BECKER.
JAMES G. ROSS.